United States Patent [19]

Gnauert et al.

[11] Patent Number: 4,921,016

[45] Date of Patent: May 1, 1990

[54] WATER MIXING VALVE

[75] Inventors: Werner Gnauert, Iserlohn; Horst Titze, Hagen, both of Fed. Rep. of Germany

[73] Assignee: Friedrich Grohe Armaturenfabrik GmbH & Co., Hemer, Fed. Rep. of Germany

[21] Appl. No.: 404,304

[22] Filed: Sep. 7, 1989

[30] Foreign Application Priority Data

Sep. 9, 1988 [DE] Fed. Rep. of Germany ....... 3830700

[51] Int. Cl.$^5$ ............................................. F16K 11/06
[52] U.S. Cl. .............................. 137/625.17; 137/625.4
[58] Field of Search ........................ 137/625.4, 625.17

[56] References Cited

U.S. PATENT DOCUMENTS 4,362,186 12/1982 Parkison et al. ............. 137/625.4 X
4,621,659 11/1986 Pawelzik ....................... 137/625.4 X
4,856,556 8/1989 Mennigmann .................. 137/625.4

FOREIGN PATENT DOCUMENTS 3202392 8/1983 Fed. Rep. of Germany ... 137/625.4

Primary Examiner—Arnold Rosenthal
Attorney, Agent, or Firm—Herbert Dubno

[57] ABSTRACT

A water mixing valve has an axially shiftable bottom pressed by water pressure against the valve seat disk in a housing for the assembly which allows the assembly to be inserted as a unit into the valve. The openings in the bottom have constrictions against which tubular seals press to provide the axial force which prevents a gap from forming between the bottom and the valve seat disk.

12 Claims, 2 Drawing Sheets

WATER MIXING VALVE

FIELD OF THE INVENTION

Our present invention relates to a water mixing valve and, more particularly, to a valve of the type which comprises a valve body having inlet and outlet fittings and in which a cartridge or valve assembly can be inserted as a unit and can include the valve seat and the control element which regulates water flow rate and temperature. More particularly, the invention relates to a valve with this assembly or the assembly alone which comprises a cup-shaped housing in which a valve seat disk is nonmovably received. A control disk is movable by an actuator against the valve seat disk, and a valve bottom is received within the housing and can press against the valve seat disk while tubular sealing members seal the openings or orifices in this valve bottom against the valve body into which the cartridge can be inserted.

BACKGROUND OF THE INVENTION

A cartridge valve assembly or, more generally, a valve assembly having the control mechanism received in a separate housing, i.e. a housing separate from the valve body into which the assembly is inserted, is described in German Open Application DE-OS 33 39 464.

In this known mixing valve, the bottom of the separate housing, i.e. the housing intrinsic to the assembly or cartridge, has two inlet openings for cold and hot water and one outlet opening for the mixed water. Cylindrical walls define these openings and are provided with hose-like or tubular seals which, on the one hand, abut a face of the valve seat disk turned toward the supply in the valve body and, on the other hand, engage in recesses in the valve body of the sanitary fixture to seal against the valve body.

When the valve is pressurized by hot and/or cold water under pressure from the supply, there is a slight axial displacement of the valve disk stack in the direction of the valve actuating member. As a result, a gap can be formed between the bottom part of the separate housing and the valve seat disk.

Because of this gap between the bottom of the housing and the valve seat disk, the radial force setting the hose-like seals is significantly reduced so that, upon the development of a pressure impulse, e.g. water hammer, in the water supply line, the sealing ring can be pressed into the gap. This results in a loss of sealing effectiveness and, obviously, a danger of deterioration or destruction of the seal.

OBJECTS OF THE INVENTION

It is, therefore, the principal object of the present invention to provide an improved valve or valve assembly of the type described with which these drawbacks are eliminated.

Another object of the invention is to provide an improved valve in which, specifically, the danger of forcing a valve seal into a gap, is greatly reduced.

Still another object is to provide a water mixing valve of the type generally described in the above mentioned reference but so constructed that with relatively simple means gap formation between the valve seat disk and the axially shiftable bottom of the housing upon pressurization of the valve can be avoided.

SUMMARY OF THE INVENTION

These objects and others which will become apparent hereinafter are attained, in accordance with the present invention by providing at least one of the walls of an opening of the axially shiftable bottom, in the region of its side turned toward the valve seat disk, with a respective constriction, or by providing each of the openings in the axially shiftable bottom with such constrictions.

Through the use of a circumferential constriction in the bottom of the separate housing, we are able to ensure that, upon the development of a pressure or upon sudden pressurization, a force component in the axial direction will become effective by the pressing of the seal against the constriction and ensure that the axially shiftable valve bottom will always be pressed against the valve seat disk.

As a consequence the compaction of the valve seat disk will result in a similar compaction of the bottom against the valve disk so that the bottom will be pressed in an identical manner into the cup-shaped housing sleeve.

Because the housing bottom lies permanently against the valve seat disk, it is not possible for pressure to force the tubular seal into a gap in this region.

At their opposite ends, the seals engage in annular recesses of the valve fixture body and are pressed into these recesses so that a gap between the bottom and the sanitary fixture body is always sealingly bridged as test results show.

With the system of the invention, relatively expensive annular recesses which have been formed in a costly manner in valve seat disks heretofore, are not necessary and the problems involved in machining such recesses in the valve seat disk, generally composed of a hard material, usually a ceramic, do not arise.

More specifically, a water mixing valve of the invention can comprise:
- a valve body formed with water inlets and a water outlet;
- a valve assembly receivable as a unit in the valve body and comprising:
  - a generally cup-shaped housing,
  - a substantially nonmovable valve seat disk received in the housing sleeve and having respective openings corresponding to the inlets and the outlet,
  - a control disk in the housing sleeve shiftable against the valve seat disk and provided with at least one passage for interconnecting the inlets and the outlet,
  - a valve bottom shiftable axially in the housing sleeve and provided with openings registering with the openings of the valve seat disk, at least one of the openings of the valve bottom having a wall formed with a respective constriction at a side of the valve bottom turned toward the valve seat disk, and
  - respective tubular elastic seals received in the openings of the valve bottom, at least one of the seals being seated against a respective constriction, the seals projecting from the valve bottom and being seated against the valve body for sealing between the valve body and the valve seat disk; and
- an actuator extending into the assembly and engaging the control disk for actuating same.

The invention also encompasses the assembly or cartridge alone.

The constriction can have a spring-like substantially sharp inwardly projecting edge and/or can be of conical configuration.

According to another feature of the invention, the constriction begins at a location of the wall spaced substantially 0.3 mm from the valve seat disk and forms a diameter reduction of substantially 0.4 mm of the respective opening of the valve bottom, the seal seated against the constriction having a thickness of about 1.5 mm and a half-round cross section where it is seated against the constriction.

According to another aspect of the invention the constriction begins at a location of the wall spaced substantially 0.2t from the valve seat disk and forms a diameter reduction of substantially 0.27t of the respective opening of the valve bottom, where t is the thickness of the seal seated against the constriction and the seal seated against the constriction has a half-round cross section where it is seated against the constriction.

BRIEF DESCRIPTION OF THE DRAWINGS

The above and other objects, features and advantages of my invention will become more readily apparent from the following description, reference being made to the accompanying highly diagrammatic drawing in which.

SPECIFIC DESCRIPTION

Figure 1:
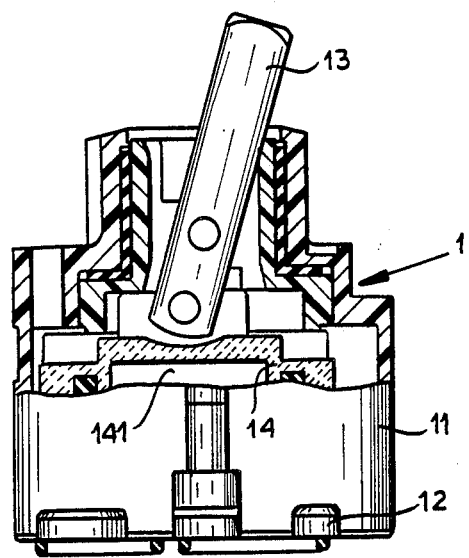
FIG. 1 is an axial section of a valve cartridge or assembly with a separate housing according to the invention and partly shown in elevation.

The water mixing valve shown in the drawing is of the cartridge type which enables the actuating assembly to be inserted in the valve body. To the extent that part have not been illustrated or depicted fully in the drawing, reference may be had to the configuration shown in the above-mentioned German Open Application and these known illustrated parts can be identical to the corresponding parts of the German Open Application.

The assembly comprises a separate housing 1 and this separate housing is insertable into the valve body 2.

The separate housing 1 is in the form of a cup-shaped sleeve 11 which receives a valve bottom 12 in the form of a disk insertable into the sleeve 11 and axially shiftable therein.

A valve seat disk 15 is mounted so as to be substantially fixed in the sleeve 1 and a control disk 14 bears against the valve seat disk 15 and can be shifted over the surface of the disk 15 by an actuating lever 13.

Figure 2:
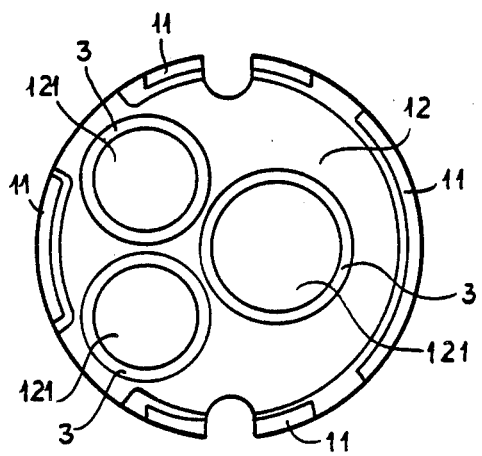
FIG. 2 is a bottom view of the underside of the valve of FIG. 1.

The valve seat disk 15 is provided with respective throughgoing openings for cold and hot water and an outlet opening for mixed water, substantially in the pattern of the openings shown in FIG. 2 and as described in the German patent document.

The control disk 14 is provided with a passage 141 which can interconnect the aforementioned openings to a greater or lesser extent depending upon the position of the control disk 14. The extent to which the inlet openings are bridged by the passage determines the temperature of the mixture and the extent to which flow cross sections are formed determines the rate of flow of the mixed water.

The valve seat disk 15 is located directly above the bottom 12 and hence the bottom 12 is positioned so that it can lie against the disk 15.

The bottom 12 has corresponding openings 121 for the water throughflow.

At the sides of the openings 12 turned toward the valve seat disk 15, each of these openings has a constriction 122 which has a spring-like character and can commence 0.3 mm from the face of the bottom 12 engageable with the valve seat disk 15 and can project about 0.4 mm toward the center in reducing the opening diameter.

Figure 3:
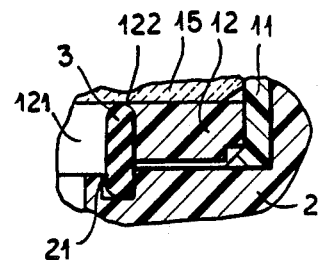
FIG. 3 is a partial section of the mixing valve of FIG. 1 in place within a valve body and drawn to a larger scale than FIGS. 1 and 2.

In the embodiment as shown in FIGS. 1 through 3, the constriction 122 has a circumferential edge projecting across the opening 121.

Within the openings 121, tubular or hose like seals 3 of elastomeric and preferably rubber are provided. The seals 3 have half round ends 31 and can have a thickness t of about 1.5 mm.

As is especially apparent from FIG. 3, the ring 3 in the region of one of its half round ends, seats against the constriction 122 and thus, upon the application of a water pressure within the seal, axially presses the bottom 12 together with the valve seat disk 15 into the cup-shaped sleeve 1.

Gap formation between the valve seat disk 15 and the bottom 12 is thus avoided.

Because the valve disks are pressed together, a gap may form between the body 2 and the bottom 12. This, however, is not detrimental since the seals 3 in this region press against the walls of annular recesses 21 in the sanitary fixture body 2.

The two similar diameter openings 121 can serve for the inlet of cold and hot water when the hot water preparation is at a pressurized central unit. The opening 121 with the larger diameter serves for discharging the mixed water.

However, if the hot water derives from a pressureless hot water storage vessel of the overflow type, the supply of cold water is effected through the opening 121 with the larger diameter while the discharge is effected in partial streams through the openings 121 with similar diameter. As a result, a partial stream of cold water can be fed to the hot water overflow storage and a corresponding amount of hot water from the hot water storage is returned to the sanitary fixture while the other partial stream is directly fed to the sanitary fixture valve where the two partial streams mix and a controlled-temperature water can be discharged.

Because of this varying use of the valve of the invention, all three openings 121 can have constrictions 122 and the water mixing valve of the invention can be utilized in sanitary fixtures of the pressurized supply type as well as of the pressureless overflow hot water storage type.

Figure 3A:
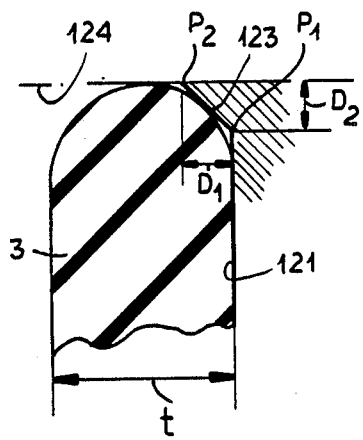
FIG. 3A is a diagram of relationships set forth in this application in a still larger scale.
Figure 4:
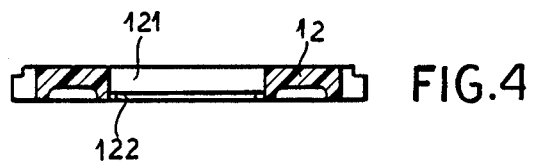
FIG. 4 is a sectional view through the bottom of FIG. 1.
Figure 5:
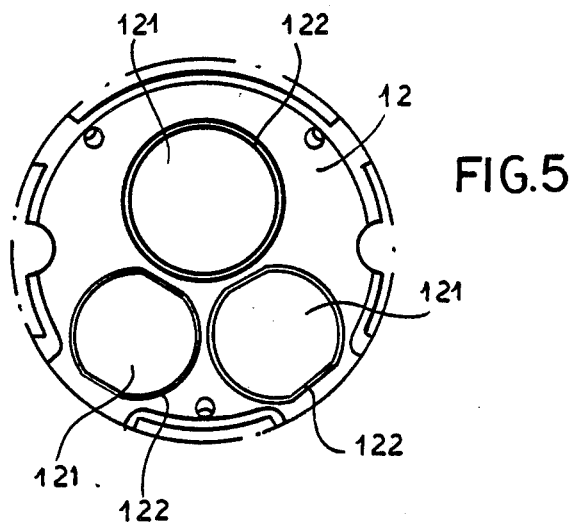
FIG. 5 is a plan view of the bottom.
Figure 6:
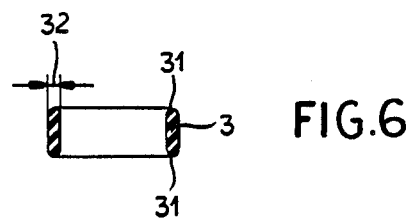
FIG. 6 is a section through the seal of FIG. 2.

From FIG. 3A, it will be apparent that a constriction 123 can be formed in a conical configuration and can begin at a point $P_1$ at a distance $D_2$ from the end face of the bottom 12 (the end face being represented at 124) so that the constriction 123 will extend across the opening 121 by a distance $D_1$ to the point $P_2$ at which a sharp edge is provided. The distance is $D_2$ and $D_1$ can be 0.3 mm and 0.4 mm, respectively where the thickness t of the sealing ring 3 is 1.5 mm. In general terms $D_2$ is 0.2t and $D_1$ is 0.27t, where t is the seal wall thickness.

We claim:

1. A water mixing valve, comprising:
   a valve body formed with water inlets and a water outlet;
   a valve assembly receivable as a unit in said valve body and comprising:
   a generally cup-shaped housing,
   a substantially nonmovable valve seat disk received in said housing sleeve and having respective openings corresponding to said inlets and said outlet,
   a control disk in said housing sleeve shiftable against said valve seat disk and provided with at least one passage for interconnecting said inlets and said outlet,
   a valve bottom shiftable axially in said housing sleeve and provided with openings registering with said openings of said valve seat disk, at least one of said openings of said valve bottom having a wall formed with a respective constriction at a side of said valve bottom turned toward said valve seat disk, and
   respective tubular elastic seals received in said openings of said valve bottom, at least one of said seals being seated against a respective constriction, said seals projecting from said valve bottom and being seated against said valve body for sealing between said valve body and said valve seat disk; and
   an actuator extending into said assembly and engaging said control disk for actuating same.

2. The valve defined in claim 1 wherein said constriction has a spring-like substantially sharp inwardly projecting edge.

3. The valve defined in claim 1 wherein said constriction is of conical configuration.

4. The valve defined in claim 1 wherein each of said openings in said valve bottom has a respective said constriction with a respective one of said seals seated thereagainst.

5. The valve defined in claim 1 wherein said constriction begins at a location of said wall spaced substantially 0.3 mm from said valve seat disk and forms a diameter reduction of substantially 0.4 mm of the respective opening of the valve bottom, said seal seated against said constriction having a thickness of about 1.5 mm and a half-round cross section where it is seated against said constriction.

6. The valve defined in claim 1 wherein said constriction begins at a location of said wall spaced substantially 0.2t from said valve seat disk and forms a diameter reduction of substantially 0.27t of the respective opening of the valve bottom, where t is the thickness of the seal seated against said constriction and said seal seated against said constriction has a half-round cross section where it is seated against said constriction.

7. A valve assembly for insertion into a valve body as a unit, said valve assembly comprising:
   a generally cup-shaped housing sleeve;
   a substantially nonmovable valve seat disk received in said housing sleeve and having respective openings corresponding to inlets and an outlet of a valve body into which said assembly is insertable;
   a control disk in said housing sleeve shiftable against said valve seat disk by an actuator and provided with at least one passage for interconnecting said inlets and said outlet;
   a valve bottom shiftable axially in said housing sleeve and provided with openings registering with said openings of said valve seat disk, at least one of said openings of said valve bottom having a wall formed with a respective constriction at a side of said valve bottom turned toward said valve seat disk; and
   respective tubular elastic seals received in said openings of said valve bottom, at least one of said seals being seated against a respective constriction, said seals projecting from said valve bottom for engagement with said valve body for sealing between said valve body and said valve seat disk.

8. The valve assembly defined in claim 7 wherein said constriction has a spring-like substantially sharp inwardly projecting edge.

9. The Valve assembly defined in claim 7 wherein said constriction is of conical configuration.

10. The valve assembly defined in claim 7 wherein each of said openings in said valve bottom has a respective said constriction with a respective one of said seals seated thereagainst.

11. The valve assembly defined in claim 7 wherein said constriction begins at a location of said wall spaced substantially 0.3 mm from said valve seat disk and forms a diameter reduction of substantially 0.4 mm of the respective opening of the valve bottom, said seal seated against said constriction having a thickness of about 1.5 mm and a half-round cross section where it is seated against said constriction.

12. The valve assembly defined in claim 7 wherein said constriction begins at a location of said wall spaced substantially 0.2t from said valve seat disk and forms a diameter reduction of substantially 0.27t of the respective opening of the valve bottom, where t is the thickness of the seal seated against said constriction and said seal seated against said constriction has a half-round cross section where it is seated against said constriction.

* * * * *